May 28, 1935.　　　　G. T. SOUTHGATE　　　　2,003,056
ELECTRIC POWER CONVERTER
Filed Nov. 30, 1931　　　　8 Sheets-Sheet 1

INVENTOR:
George T. Southgate,
BY Byrnes, Townsend & Potter,
ATTORNEYS.

Fig. 3.

May 28, 1935. G. T. SOUTHGATE 2,003,056
ELECTRIC POWER CONVERTER
Filed Nov. 30, 1931 8 Sheets-Sheet 3

INVENTOR:
George T. Southgate,
BY Byrnes, Townsend & Potter,
ATTORNEYS.

May 28, 1935.  G. T. SOUTHGATE  2,003,056
ELECTRIC POWER CONVERTER
Filed Nov. 30, 1931   8 Sheets-Sheet 5

Fig. 16.

May 28, 1935.  G. T. SOUTHGATE  2,003,056
ELECTRIC POWER CONVERTER
Filed Nov. 30, 1931  8 Sheets-Sheet 7

INVENTOR:
George T. Southgate,
BY Byrnes Townsend & Potter,
ATTORNEYS.

May 28, 1935. G. T. SOUTHGATE 2,003,056
ELECTRIC POWER CONVERTER
Filed Nov. 30, 1931 8 Sheets-Sheet 8

INVENTOR:
George D. Southgate,
BY
ATTORNEYS.

Patented May 28, 1935

2,003,056

UNITED STATES PATENT OFFICE 2,003,056

ELECTRIC POWER CONVERTER

George T. Southgate, Forest Hills, N. Y., assignor to Union Carbide and Carbon Research Laboratories, Inc., a corporation of New York Application November 30, 1931, Serial No. 578,136

13 Claims. (Cl. 171—123)

This invention relates to an electric power converter especially adapted for use in arc welding. An object of this invention is to provide a current supply device which shall be relatively inexpensive and shall have a small number of moving parts. Another object of this invention is to provide a device of this class which shall supply a current having the desired voltage characteristics, such as the drooping voltage with increasing current desirable in arc welding. Still another object is to provide a current supply device having means for regulating the voltage of the output current. Further objects of the invention are to provide a source of current which shall be lighter than a motor generator set and to provide a new method of assembling a transformer core especially adapted to give a leakage of the magnetic flux.

These and other objects of my invention will be evident from the following specification having reference to the accompanying drawings in which.

The device illustrated in the drawings consists of a transformer 21 having a primary 22 and a secondary 23 with a commutating device 24 connected to the coils of the secondary. Pairs of revolving brushes are mounted upon a rotating brush system 25 and serve to connect commutator sectors 26 with collecting rings 27 and 28. As a part of the brush system 25, a plate 44 carrying the brushes is rotated by a synchronous motor 29, which receives current from the line 31 which supplies alternating current to the primary 22. The motor and transformer are mounted on a base 32.

The transformer 21 resembles an induction motor, the primary 22 being similar to a rotor having a three-phase, four-pole winding, having for example 60 and coils and being series star connected. The secondary corresponds to the stator of the motor and is in the nature of a Siemens winding having, for example, 60 coils; the junction of each coil with the next coil being connected to one of the commutator sectors 26. These sectors or bars are mounted upon an insulating plate, which in turn is supported upon the frame of the stator. Current from the line 31 is supplied to the primary 22 through slip rings 33. Since the primary does not rotate a complete revolution, it would be possible to use wire connections, but I prefer to use slip rings; since in emergencies when alternating current is not available the rotor can be driven by a power source, the brush system 25 locked to the rotor and the rotor excited from the output system, which would still consist of the stator winding, the stationary commutator and the revolving brushes. The primary is mounted on a shaft 34 which is prevented from rotating by a worm wheel 35 secured to one end of the shaft 34 and engaging a worm 36. By means of this worm and wheel it is possible to angularly move the primary winding with respect to the secondary winding to regulate the voltage as will be explained more fully below.

The core 37 of the primary is laminated as is usual in the rotors of induction motors. While I may use any convenient type of laminations I prefer to use the construction shown in Figs. 12 to 15 inclusive. This construction consists of alternate plates 38 and 39, the teeth of the plates 38 extending outwardly a less distance than those of the plates 39. These plates are assembled in alternate relation and the windings 41 inserted in the notches between the teeth, the diameters of the circles through the bottoms of the notches being the same. After the windings 41 are in place, split rings 42 are inserted between the protruding teeth of adjacent plates 39. These rings fit over the ends of the teeth of plate 38 with the outer edge of the rings flush with the ends of the teeth of plate 39. The rings 42 serve the double purpose of holding the windings in place and building up a magnetic structure such as to provide a flux leakage whereby the drooping characteristic of the output voltage desirable in welding operations is secured; this arrangement of the primary giving an effect equivalent to the introduction of reactance in series with the primary.

It will be evident that if a three-phase alternating current be applied to the primary, a rotating field is produced. The lines of force of this magnetic field are cut by the windings of the secondary, and induce currents therein. If proper provision be made for collecting these currents, it will be evident that a direct current may be delivered. This collecting mechanism comprises the commutator bars or sectors 26 and the collecting rings 27 and 28 together with a suitable rotating brush system 25 serving to transmit current from the commutator sectors to the collecting rings. This brush arrangement must bear a suitable relation to the rotating field and I prefer to maintain this relation by having the rotating system carrying the brushes driven by a synchronous motor 29 supplied with current from the same mains 31 which supply current to the primary 22.

The rotating brush system 25 comprises a plate 44 having a sleeve 45, mounted on an extension of the shaft 34. Mounted on the plate 44, but insulated therefrom, are pairs of brush structures 46—46, 46'—46', 47—47 and 48—48. The brush structures 46—46 and 46'—46' are similar in construction and the brushes engage the commutator bars 26. The pair 46—46 is spaced 90° from the pair 46'—46' and one serves to collect positive current and the other negative current. One of these pairs, as 46—46, is connected to the pair 47—47 which engages the outer collecting ring 28 while the other pair is connected to the inner pair of brushes 48—48 which engages the inner ring 27. It is obvious that instead of using the connected brush arrangements 46—47 and 46'—48, I could employ for each a single brush engaging both the commutating sectors and one of the collecting rings. However, due to the unequal wear on the smooth ring and the interrupted commutating structure, and due to the fact that brushes having different characteristics are desirable, I prefer to use separate brush structures as shown. The rotating brush system 25 is surrounded by a cover 49. The sleeve 45 also carries a blower member 51 which serves to force air through the transformer 21.

Due to the fact that the synchronous motor which drives the rotating system 25 may have a low starting torque, it is sometimes desirable that means be provided for minimizing friction at this period. For this reason I may provide centrifugally operated brush structures for the three outer pairs of brushes. This type of brush structure might also be provided for the inner pair of brushes 48—48; but I prefer not to do so since I have found the friction of one pair of brushes does not materially impede the starting of my device, space is not conveniently available near the center of the rotating structure, and the centrifugal force is not as great at this position.

Figure 6:
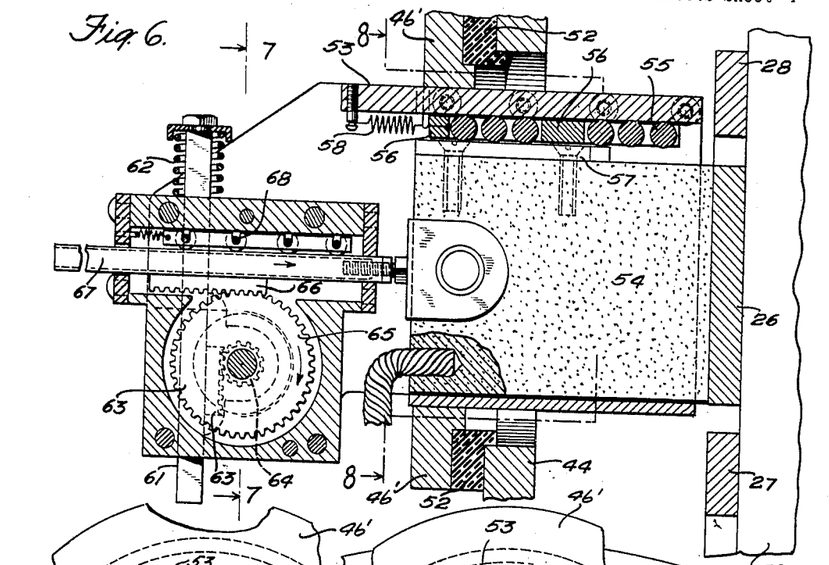
Fig. 6 is a section on the line 6—6 of Fig. 2 showing details of the brush holder.
Figure 7:
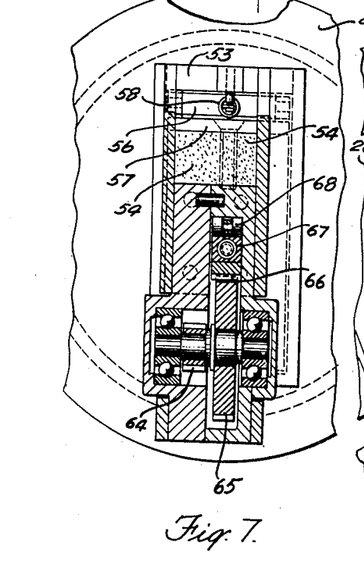
Fig. 7 is a section on the line 7—7 of Fig. 6 showing the centrifugally operated brush holding mechanism.
Figure 8:
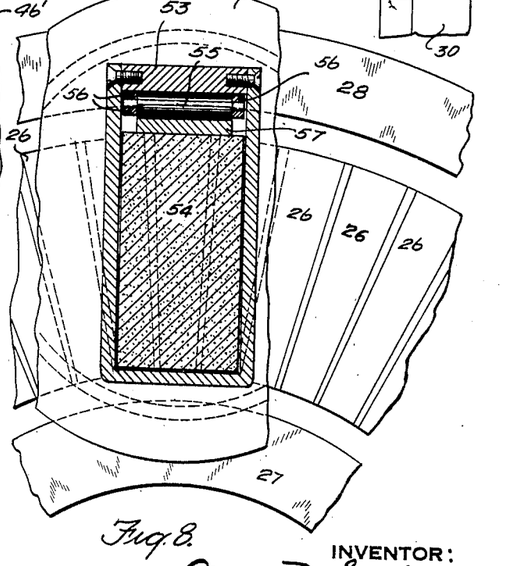
Fig. 8 is a section on the line 8—8 of Fig. 6 showing the brush and its relation to the commutator sectors.

One of the brush structures 46 is shown in detail in Figs. 6, 7 and 8. A ring 52, of insulating material, is mounted on the plate 44. A brush holder 53 is mounted on the insulating ring and the brush 54 slides within the brush holder. Due to the fact that the brush system 25 rotates rapidly the brush 54 is thrown outwardly against the brush holder 53. In order to reduce friction, rollers 55 are provided. These rollers are mounted in a carriage 56 and engage the inner surface of the outer side of the brush holder 53 and a face plate 57 secured to the brush 54. The carriage is retained in position by means of a spring 58. In order to force the brush against the commutating sectors in operation I provide an inertia member 61 which is subject to centrifugal force. When the device is stationary the inertia member 61 is biased gently outwardly by a spring 62, and during rotation it tends further to be forced outwardly by the centrifugal force developed by the rotation. Were the springs 62 not provided there would be a tendency for the member 61 to rattle before the device had come up to speed. The inertia member 61 is provided with a rack 63 which engages the pinion 64. This pinion is connected to a larger pinion 65 which engages a rack 66 on a bar 67, which exerts pressure on the brush 54. For reducing the friction of the bar 67 suitable rollers 68 are provided, they being mounted on a carriage as were the rollers 55. It will be evident that during the rotation of the brush system 25, member 61 is forced outwardly revolving the pinions 64 and 65 and exerting pressure on the brush 54 through the rack 66 and bar 67.

Figure 1:
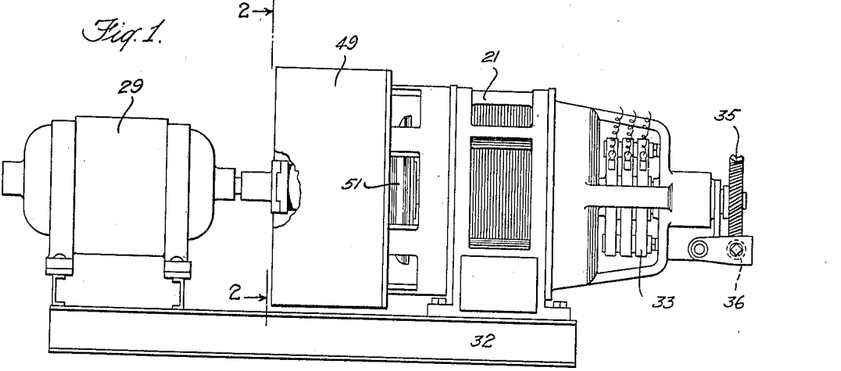
Fig. 1 is a diagrammatic view of a device constructed in accordance with one embodiment of my invention.
Figure 2:
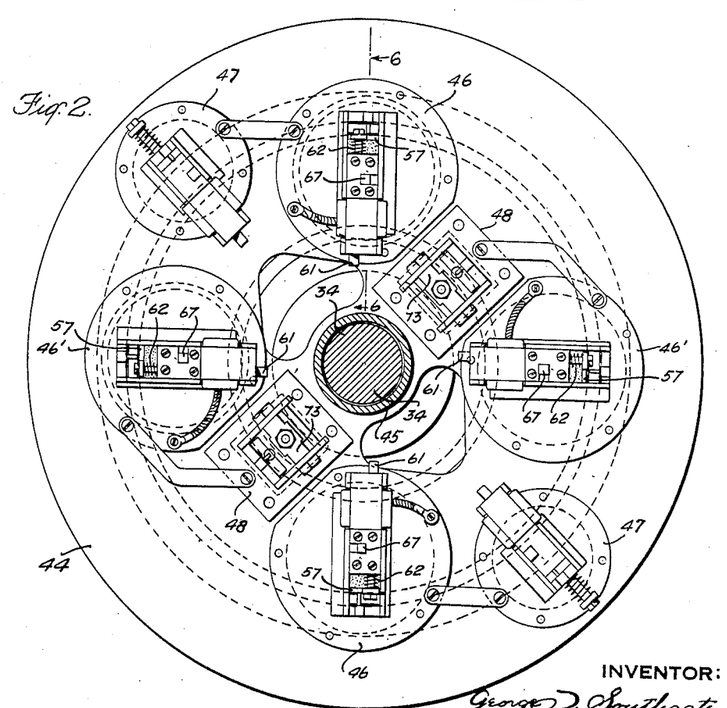
Fig. 2 is an end view taken in section on the line 2—2 of Fig. 1, showing the details of the rotating brush carrying member.
Figure 3:
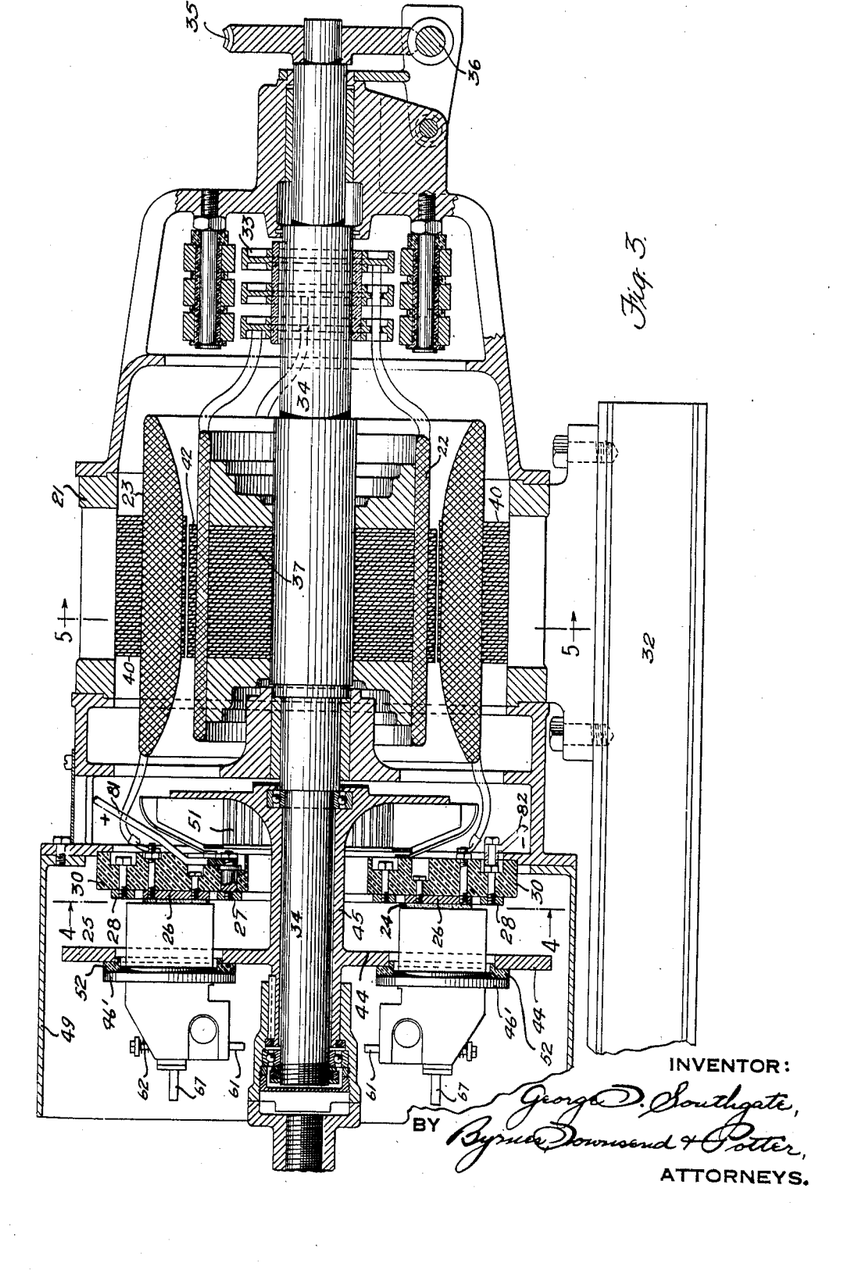
Fig. 3 is a longitudinal section of the device with the motor for driving the rotating brush carrying member omitted.
Figure 4:
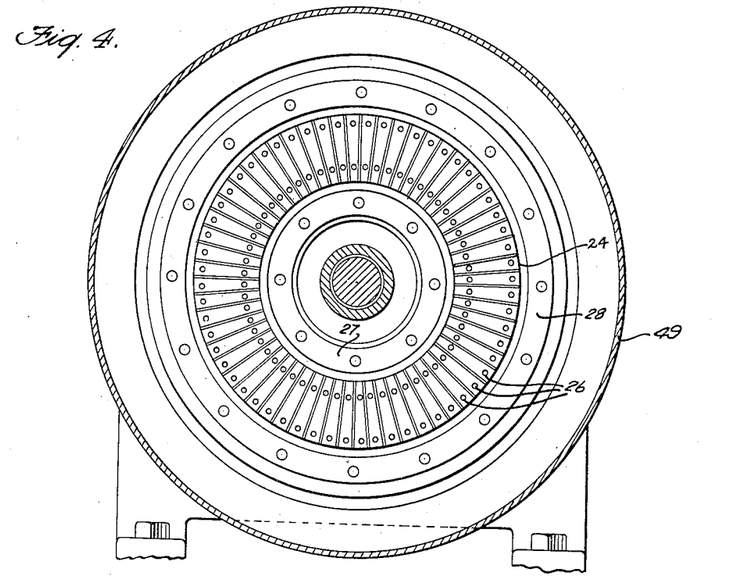
Fig. 4 is a section on the line 4—4 of Fig. 3 showing the arrangement of the commutator bars or sectors and collecting rings.
Figure 5:
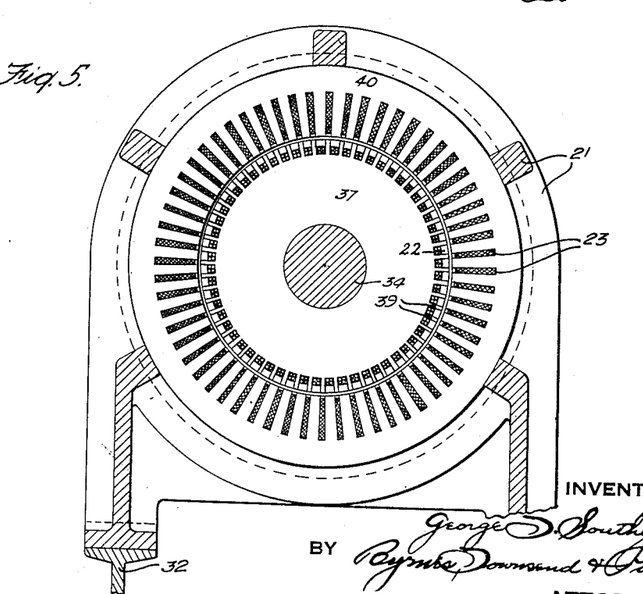
Fig. 5 is a section on the line 5—5 of Fig. 3.
Figure 9:
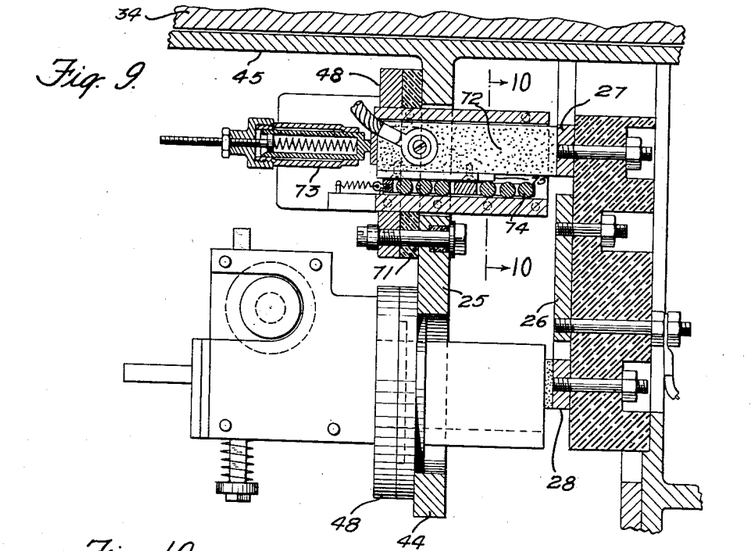
Fig. 9 is a section through the spring-operated brush holders.
Figures 10, 13, 14, 15:
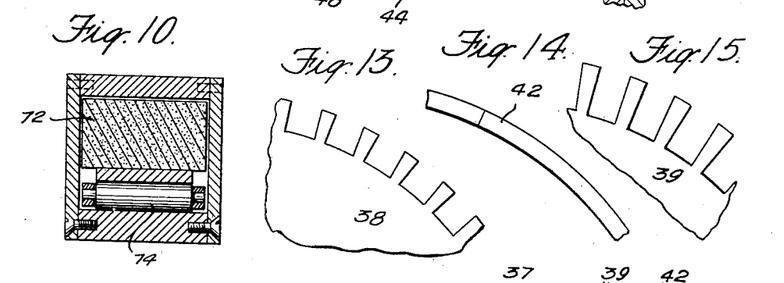
Fig. 10 is a section on the line 10—10 of Fig. 9 showing the arrangement for reducing the friction in the inner pair of brushes.
Figs. 13, 14 and 15 are views of portions of members forming the core.
Figure 11:
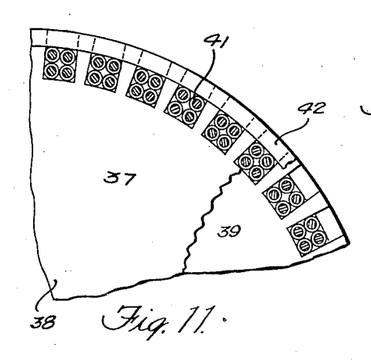
Fig. 11 is a partial section showing the primary winding.
Figure 12:
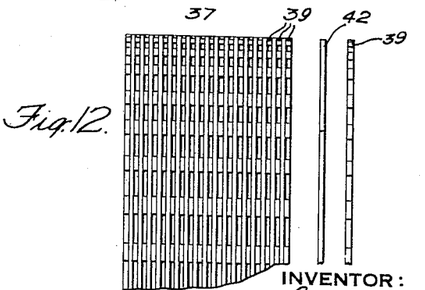
Fig. 12 is a diagrammatic view of the primary core.

The brush structures 47 are constructed similarly. This mounting is indicated in Fig. 9 and is there shown as aligned with a brush structure 48 for the purpose of indicating their relative radial positions. Actually the members 47 and 48 are spaced 90° apart as is shown in Fig. 2. The brush structure 48 comprises an insulating member 71 mounted on the plate 44. The brush 72 is urged toward its slip-ring by a spring actuated member 73. Suitable rollers 74 engage a face plate 75 on the brush 72 for the purpose of minimizing friction.

As shown in Fig. 2 one pair of brush structures 46 is connected to brush structures 47 and another pair of brush structures 46' is connected to inner brush structures 48. It is therefore evident that direct current is supplied to the collecting rings 27 and 28. Suitable provision is made for delivering this current to the welding mains, as indicated by leads 81 and 82. The rotating brush structure is kept synchronous with the rotating field since they are both in phase relation with the alternating current supplied by the mains 31.

Figure 16:
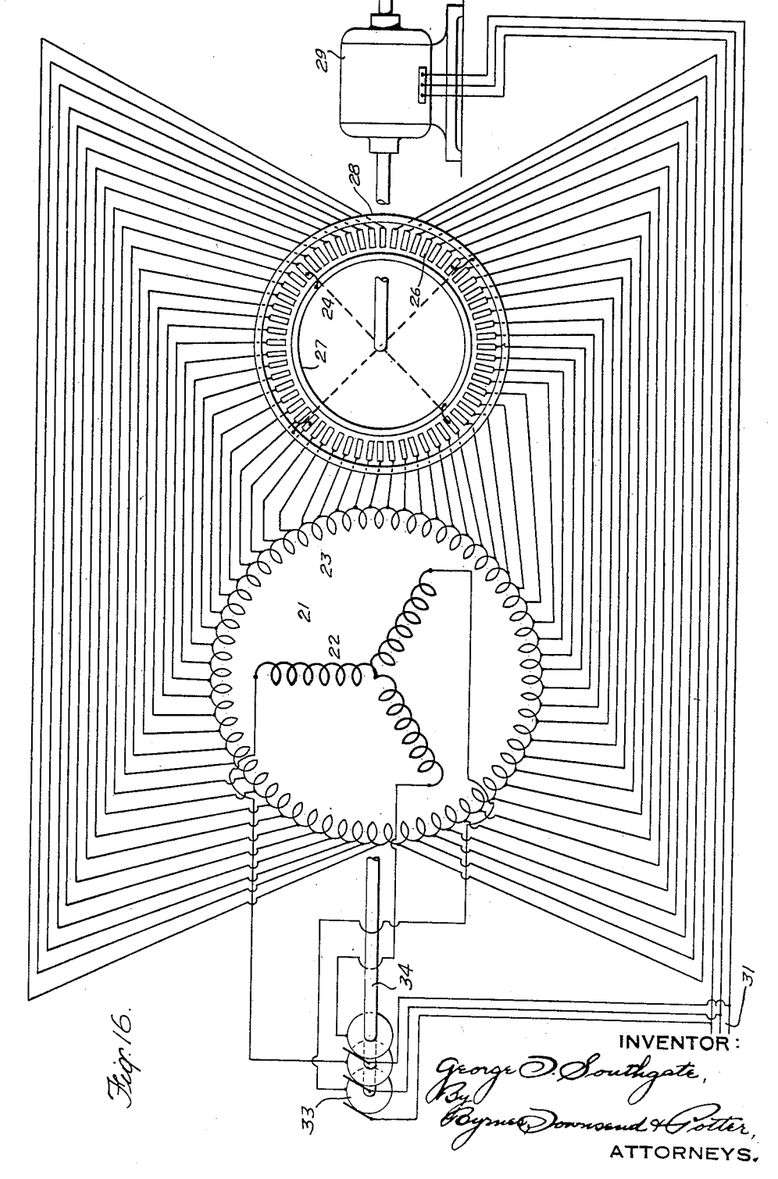
Fig. 16 is a complete wiring diagram of the converter, showing the relation of the primary to the secondary winding, that of the secondary to the commutator and that of the auxiliary motor to the primary circuit and to the brushes.

In the connection diagram, Figure 16, the primary of the polyphase transformer is shown conventionally as a Y winding, as might be the primary of an induction motor. Surrounding this Y, the secondary of the transformer is shown as a Gramme ring with tap leads running to the bars 26 of the stationary commutator. Obviously the secondary winding may be of any of the closed-circuit forms usual in direct-current machines, and may be wave- or lap-wound, series- or parallel-connected, in the usual sense of these terms. The supply of the synchronous motor 29 with three-phase current is shown as from the same mains 31 that serve the primary of the transformer. This motor is co-axial with but not coupled to the rotor of the transformer.

When it is desired to adjust the voltage or range of voltage delivered to the load, this is conveniently done by changing the phase relation between the rotating magnetic field and the rotating brush structure. For this purpose the worm 36 is rotated, moving the shaft 34 and shifting the phase of the rotating field that is induced in the rotor by the polyphase excitation impressed thereon. Since the polyphase voltages supplying this excitation are identical with those by which the synchronous motor is excited, and since the frictional load on the motor does not change with adjustment of the polyphase transformer, the phase shifting effected in the primary of the transformer by this means accomplishes the desired regulation of direct-current output voltage from the power converter.

Figure 17:
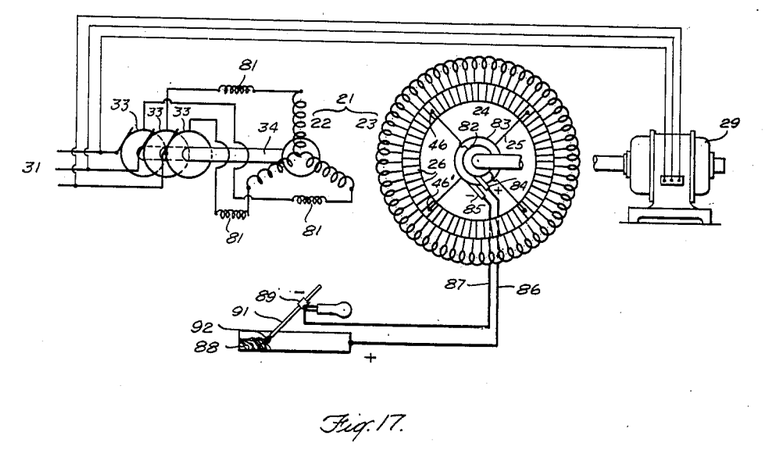
Fig. 17 is an additional wiring diagram illustrating one form of arc-welding system embodying the power converter.

The wiring diagram constituting Fig. 17 represents an arc-welding system embodying my aforedescribed power converter wherein the superinduced primary flux leakage provides the reactance which serves as ballast for regulating the arc current. This ballasting reactance, which affects the entire system, is represented by the conventional loops between the input slip rings and the winding as separate inductance but understood to signify the self-inductive effect of the superinduced internal flux leakage. Consistent with such representation, the synchronous motor is represented as tapped from the supply lines before their entrance to the flux-leaky transformer.

In Fig. 17, as in the previous figure, the transformer 21 is comprised of the primary 22 and the secondary winding 23. The primary, here illustrated as a rotor, understood to be locked, is served by the supply line 31 through the slip rings 33; and the conventions 81 represent the self-inductance within the primary winding 22 caused by superinduced flux leakage. The secondary 23 is shown connected to the sectors 26 of the commutator 24, and the brush system 25 is diagrammed as lines terminating at their outer ends in dots representing the brushes 46 and 46'. The other ends of the commutating brush system are here connected directly to rotary delivery rings 82 and 83, upon which bear the output brushes 84 and 85. The output brushes are connected by wires 86 and 87 to the work body 88 and the welding tool 89 respectively. This tool carries the electrode 91 from which, under spatial control of an operator or an automatic welding machine (not shown) the arc 92 plays to the work-body 88. In metal-electrode welding, the polarity of the arc circuit is usually, though not necessarily, as shown in the figure.

Figure 18:
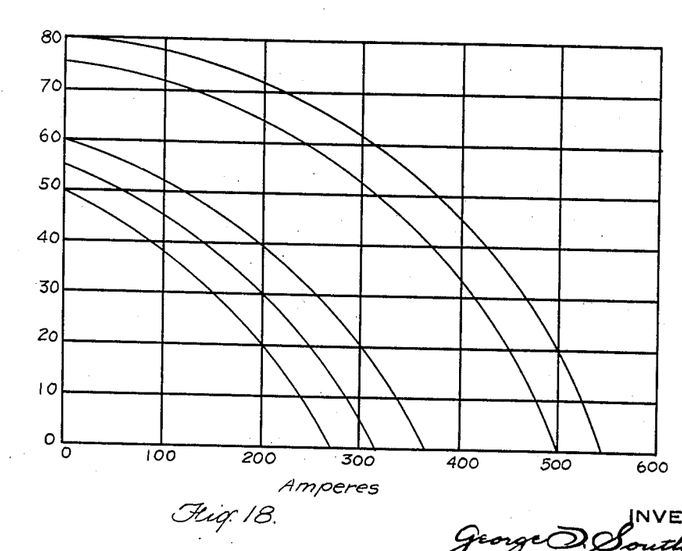
Fig. 18 is a set of curves representing output voltages and currents at the machine for the arrangement shown in Fig. 17.

In Fig. 18 are several curves illustrating the behavior of the welding system represented in Fig. 17. In this system the voltage curves are substantially the same at the power converter terminals as at the arc, unless the service wires from the machine to the arc have unduly high resistance or reactance. They show, first, for any curve selected the drooping of output terminal voltage against increasing current due to the superinduced primary flux leakage, and second, by the plurality of the curves, a number of different settings of phase relationship between the rotating magnetic field and the rotating brushes, with resultant adjustment of output voltage levels.

The upper curve corresponds to that setting giving the maximum obtainable output voltage at open circuit, and the corresponding voltage at any ampere load up to short circuit. When the rotor worm-wheel adjustment is altered so that the brushes and rotating field are less closely in phase agreement, the curve moves downward as a whole. Thus, by suitably adjusting the angular position of the rotor the volt-ampere curves may be shifted as desired for large or small powers and more particularly for adaptation to either carbon-electrode or metallic-electrode welding, at respectively higher or lower voltage. The general shape of these curves is determined by the amount of magnetic flux leakage provided in the design.

It is sometimes convenient to employ my improved apparatus without provision as above for the strongly drooping characteristic of the voltage at the machine, yet retaining the mechanical adjustability of output voltage represented by the plurality of these curves. This is easily arranged in my invention by omitting in the structure of the primary the arrangement for increasing its flux leakage. In this case there would remain, as in the upper solid graphs of Fig. 20, a family of curves having only the slight drooping voltage due to the reactance and resistance values inherent in the machine and its power source, unmodified by superinduced flux leakage.

Figure 19:
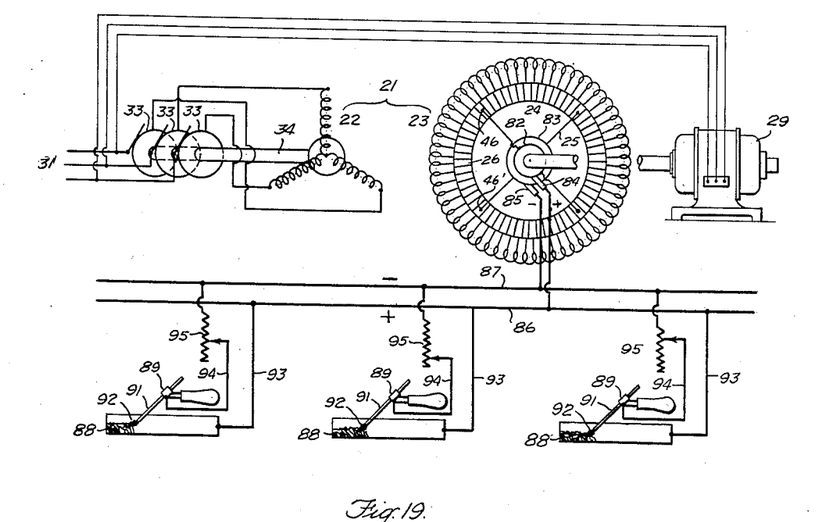
Fig. 19 is a wiring diagram illustrating a form of arc-welding system also embodying my power converter, but modified from the system shown in Fig. 17.

In Fig. 19 there is illustrated an arc welding system embodying the above-described form of my power converter, in which the arrangement for increasing its primary flux leakage is omitted, in combination with a set of multiple welding circuits, each comprising a ballast resistance and a working arc. This is the arrangement preferred for the use of my invention in multiple-arc welding, wherein each operator has for his service an individual electrically flexible circuit, but in which all of these circuits are served by one power converter. Such a system is particularly adapted for shop work, as distinguished from individual repair jobs in the field, and it has the advantage that one large power converter is less expensive than a number of smaller individual machines.

The system diagramed in Fig. 19, like that in Fig. 17, is based upon the power converter's arrangements shown in Fig. 16; but it differs in that it does not include the augmented internal inductance represented in Fig. 17 as the convention 81, and it differs further in relation to the load-circuit arrangements. The output leads are here represented as the horizontally drawn mains 86 and 87, and all of the part numbers thereabove (with the omission of 81) are the same as in Fig. 17, as are also the parts 88, 89, 91 and 92 in the several branch circuits. Each of such branch circuits includes the leads 93 and 94 and the rheostat 95.

Figure 20:
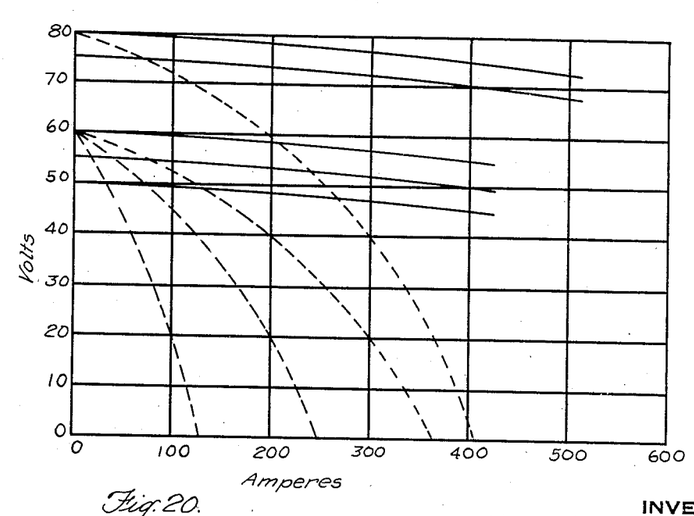
Fig. 20 is a set of curves representing (in full lines) output voltages and currents at the converter, and another set of curves (in broken lines) representing these quantities at the arc, for the conditions shown in Fig. 19.

In Fig. 20 the broken-line graphs illustrate, for several individual arcs served by the one power converter under the system described with reference to Fig. 19, the droop of voltage against increasing current which is regulated by each operator for his individual circuit by means of variation in his individual ballast. The three broken-line curves which meet at zero amperes, 60 volts, correspond, for example, to the three positions at which rheostats 95 are shown in Fig. 19.

In the examples of my power converter aforedescribed, the primary winding has been assumed as in the rotor and the secondary in the stator, with the commutator fixed upon the stator frame. In a somewhat different arrangement of my invention, conforming to the same general principles, the primary winding may be mounted as the stator and the secondary built into the rotor, with the commutator preferably remaining fixedly mounted upon the stator frame. In this modification, adjustment of the output voltage of the machine may be effected by the means previously described, that is, by varying the angular position of the rotor. Herein the variation of output voltage still results from shifting the phasing of the induced voltage relative to the revolving brushes, inasmuch as adjustment of the rotor of the transformer affects neither the synchronous motor nor the position of the commutator sectors. Thus if the secondary is moved forward each coil thereof is in a position to receive from the stationary primary winding an induction differing in time phase from that corresponding to the original position of the rotor.

While the power converter has been described as having the familiar three-phase primary winding, it will be understood that a two-phase or split single-phase or other typical alternating-current winding could be used, and with either star or mesh connection.

It will be obvious from the foregoing description that the regulation of output voltage by adjustment of time phase as between the revolving brushes and the rotatively induced secondary electromotive force is peculiar to my invention, and that it offers special advantages in adapting the machine to the supply of welding current at either relatively low or relatively high voltage. These two ranges of voltages are particularly suited for the two main classes of use, respectively metallic electrode welding and carbon- or graphite-electrode welding. The special adaptability of the machine as a power converter for arc welding is also largely related to the compactness of its construction in comparison with a motor generator, and to its much lighter weight in the same comparison. Inasmuch as the majority of arc-welding power machines are needed at changing localities, the improvement in portability resulting from these reductions is an essential advantage of my invention.

My power converter has the additional advantage that its voltage responses to variations in arc-welding condition are undelayed. This is another distinction from the ordinary welding generator, whereof the regulation of drooping output voltage is accomplished by variation in the direct-current excitation of a magnetically massive field structure, and wherefore variation of exciting force impressed upon this field is followed by rather slow response of change in actual flux.

I claim:

1. In a device for supplying direct current, the combination of a polyphase primary winding, a secondary winding, means for supplying alternating current to said primary winding to produce a rotating magnetic field therein, a commutating device electrically connected to said secondary winding, said commutating device including a rotating part, means for rotating said part in synchronism with the rotating magnetic field in the primary winding, and means for angularly moving the primary and secondary windings relatively to each other for changing the phase relation between said rotating part and said rotating field.

2. In a device for supplying direct current, the combination of a core structure having slots, a primary winding embedded in said slots, a secondary winding adjacent to the primary winding, means for supplying alternating current to said primary winding to produce a rotary magnetic field therein, a commutating device electrically connected to said secondary winding, said commutating device including a rotating part, and means for rotating said part in synchronism with the rotating magnetic field in the primary winding, said core structure having magnetic material arranged to bridge the slots and cover portions of the winding embedded therein.

3. In a device for supplying direct current, the combination of a core structure having slots, a polyphase primary winding embedded in said slots, a secondary winding disposed adjacent thereto, means for supplying alternating current to said primary winding to produce a rotating magnetic field therein, a commutating device electrically connected to said secondary winding, said commutating device including a rotating part, means for rotating said part in synchronism with the rotating magnetic field in the primary winding, and means for changing the phase relation between said rotating part and said rotating magnetic field, said core structure having magnetic material arranged to bridge the slots and cover portions of the winding embedded therein.

4. In a device for supplying direct current, the combination of circular primary and secondary windings, means for supplying alternating current to said primary winding to produce a rotating magnetic field therein, a commutating device electrically connected to said secondary winding, said commutating device including rotating brushes, means including a synchronous motor electrically connected with the above mentioned alternating current supply for rotating said brushes in synchronism with the rotating magnetic field in the primary winding, and means for producing a relative angular movement between the primary winding and the stationary part of said commutating device for varying the voltage of the direct current supplied by said device.

5. An electrical machine comprising two field structures in juxtaposed relation, the windings of one of said fields being so arranged that a rotating magnetic field is produced by the application of a polyphase alternating current thereto, a commutating structure electrically connected to the other field structure, said commutating structure including a rotating part and a synchronous motor electrically connected to the source of polyphase alternating current, and means for changing the angular relation between said first mentioned field structure and the stationary part of the commutating structure.

6. An electrical machine comprising a field structure in the form of a Siemens winding, a plurality of commutating sectors connected to said windings, a rotating brush holder provided with brushes in contact with said sectors, means adjacent to said field structure for producing a rotating magnetic field upon the application thereto of a polyphase alternating current, means actuated by said current for rotating said brush holder in synchronism with said rotating magnetic field, and means for angularly moving said winding and said rotating magnetic field producing means relatively to each other.

7. An electrical machine comprising two circular field structures, one of said structures serving as a primary and being so wound as to produce a rotating magnetic field upon the application thereto of a polyphase alternating current, the other of said field structures serving as a secondary and having commutating mechanism electrically connected thereto, the primary field structure being provided with a core composed of slotted toothed discs, the teeth of alternate discs being shorter than the teeth of the discs therebetween and rings of magnetic material supplementing the discs with the shorter teeth, said rings being flush with the longer teeth.

8. A source of direct current adapted for supplying current comprising circular primary and secondary field structures in inductive relation, the windings of the primary field structure being so arranged that application of polyphase alternating current thereto will produce a rotating magnetic field therein, a core within said windings and having a portion disposed over and extending beyond said windings whereby a flux leakage is produced in said primary field structure, a plurality of commutator sectors electrically connected to the windings of said secondary field structure, collecting rings and brushes cooperative therewith to deliver the direct current to the load, a rotating member adjacent said sectors, means in electrical connection with the source of alternating current supply of the primary windings for rotating said member in synchronism with the rotating magnetic field in the primary field structure, brushes on said member cooperative with said commutator sectors, means for urging said brushes against said sectors, and means for causing a relative angular movement between the primary field structure and commutator sectors whereby the voltage of the current delivered is varied.

9. In an electrical machine for supplying direct current, comprising the combination of a primary field structure mounted on a shaft, a secondary field structure surrounding said primary field structure, said secondary field structure being mounted independently of said primary field structure, a plurality of commutator sectors electrically connected to the windings of said secondary field structure, a sleeve rotatably mounted on said shaft, a rotating brush carrying structure carried by said sleeve, means for rotating said sleeve, and means for angularly moving said shaft.

10. In a device for supplying direct current having a drooping voltage characteristic, the combination of a laminated core structure having slots, a primary winding arranged in said slots, a portion of said core structure bridging adjacent laminations at the slots to provide augmented inductive reactance, a secondary winding adjacent to the primary winding, means for supplying alternating current to said primary winding to produce a rotary magnetic field therein, a commutating device electrically connected to said secondary winding, said commutating device including a rotating part, and means for rotating said part in synchronism with the rotating magnetic field in the primary winding.

11. In a device for supplying direct current having a drooping voltage characteristic, the combination of a circular primary and an annular secondary winding, means for supplying alternating current to said primary winding to produce a rotating magnetic field therein, a commutating device electrically connected to said secondary winding, said commutating device including rotating brushes, means including a synchronous motor electrically connected with the above-mentioned alternating current supply for rotating said brushes in synchronism with the rotating magnetic field in the primary winding, and means for producing a relative angular movement between the primary winding and the stationary part of said commutating device for varying the voltage of the direct current supplied by said device and concomitantly producing a relative angular movement between the primary winding and the secondary winding for changing the flux leakage linked with said primary winding.

12. In an electrical machine adapted for supplying direct current, comprising the combination of a field structure in the form of a Siemens winding, a plurality of commutator sectors connected to said windings, a rotating brush holder provided with brushes in contact with said sectors, a winding having a core within said field structure for producing a rotating magnetic field upon the application thereto of a polyphase alternating current, means actuated by said current for rotating said brush holder in synchronous relation with said rotating magnetic field, and means for varying the phase relation between said brush holder and said rotating magnetic field and concomitantly varying the angular relation between said core and said field structure whereby the inductive reactance is varied.

13. In a device for supplying direct current having a drooping voltage characteristic, the combination of a core structure provided with slots, a polyphase primary winding arranged in said slots, an annular secondary winding disposed circumferentially thereto, means for supplying alternating current to said primary winding to producing a rotating magnetic field therein, a commutating device electrically connected to said secondary winding, said commutating device including both stationary and rotating parts, means for rotating said rotary part in synchronous relation with the rotating magnetic field in the primary winding, the core structure of said primary winding having portions thereof extending across the slots at the openings thereof for producing a magnetic flux leakage in said primary core structure and means for angularly moving said core structure relatively to said secondary winding.

GEORGE T. SOUTHGATE.